United States Patent [19]

Daimer et al.

[11] Patent Number: 4,590,245

[45] Date of Patent: May 20, 1986

[54] SELF-CROSSLINKING CATHODICALLY DEPOSITABLE ED-BINDERS CONTAINING MODIFIED ALKYLPHENYL-FORMALDEHYDE CONDENSATION PRODUCTS

[75] Inventors: Wolfgang Daimer; Johann Gmoser; Rudolf Schipfer, all of Graz, Austria

[73] Assignee: Vianova Kunstharz, A.G., Werndorf, Austria

[21] Appl. No.: 591,591

[22] Filed: Mar. 20, 1984

[30] Foreign Application Priority Data

Mar. 21, 1983 [AT] Austria ................................. 974/83

[51] Int. Cl.⁴ ........................ C08G 8/36; C08G 59/08; C08G 59/14
[52] U.S. Cl. ................................. 525/504; 204/181.7; 525/507; 528/85
[58] Field of Search ................... 525/507, 504; 528/85; 204/181 C, 181.7

[56] References Cited

U.S. PATENT DOCUMENTS

| | | | |
|---|---|---|---|
| 3,384,606 | 5/1968 | Dieterich et al. | 525/504 X |
| 3,429,848 | 2/1969 | Robins | 525/504 X |
| 4,079,031 | 3/1978 | Sardessai et al. | 528/85 X |
| 4,201,835 | 5/1980 | Jellinek et al. | 528/85 X |
| 4,238,594 | 12/1980 | Pampouchidis | 204/181 C X |
| 4,268,649 | 5/1981 | Jellinek et al. | 528/85 X |
| 4,315,840 | 2/1982 | Kempter et al. | 204/181 C X |
| 4,364,860 | 12/1982 | Patzschke et al. | 204/181 C X |
| 4,376,848 | 3/1983 | Subramanyam et al. | 204/181 C X |
| 4,436,881 | 3/1984 | Laitar | 525/504 |
| 4,443,569 | 4/1984 | Schröder et al. | 204/181 C X |

*Primary Examiner*—Howard E. Schain
*Attorney, Agent, or Firm*—A. W. Breiner

[57] ABSTRACT

Cathodically depositable self-crosslinking binders for electrodeposition based on alkylphenol-formaldehyde condensates wherein an alkylphenol-formaldehyde condensate having a molecular weight of at least 500 and a hydroxyl value of between 100 and 700 mg KOH/g, modified through self-condensation or etherification of the phenolic hydroxy groups, obtained through a reaction catalyzed with a base (component A), is reacted simultaneously or separately with (B) amines which carry a tertiary amino group and at least one hydroxy group or primary or secondary amino group (component B) and (C) aromatic or aliphatic or cycloaliphatic polyisocyanates (component C), the weight ratio of components being chosen in order that for each mole of component (B) 2 to 4 NCO-equivalents of component (C) are present and that the resultant isocyanate-group-free reaction product has an amine value of between 40 and 120 mg KOH/g is described. The binders are internally platicized to provide increased flexibility of coatings prepared from the binders which are essentially chip resistant.

19 Claims, No Drawings

SELF-CROSSLINKING CATHODICALLY DEPOSITABLE ED-BINDERS CONTAINING MODIFIED ALKYLPHENYL-FORMALDEHYDE CONDENSATION PRODUCTS

The present invention is directed to cathodically depositable self-crosslinking binders for electrodeposition coatings (CED) based on alkylphenol-formaldehyde condensation products, and to a process of producing the binders.

A substantial number of CED binders is known in the prior art disclosing the use of a variety of raw materials and methods of production, for example as disclosed in "Advances In Electropainting 1978–1980" of R. H. Chandler Ltd., March, 1981. In practice it has been established that only a relatively small number of raw materials can be used in the manufacture of anti-corrosive primers. Useful materials include the epoxy resins such as the di- or polyglycidyl ethers of bisphenols or phenol novolaks. Although anti-corrosive cationic binders based on bisphenolglycidyl ether resins are obtained substantially meeting the technical requirements of the binders, they still have the known disadvantages of unsatisfactory tooling characteristics, unless they are properly plasticized. A particular disadvantage of such binders is the unsatisfactory chip resistance of the cured coating. Satisfactory chip resistance is a major exigency for automobile coatings.

It is the object of the present invention to provide self-crosslinking cationic binders with properties and a performance which meets the requirements for automobile coatings. Surprisingly, this objective can be accomplished by employing an alkylphenol-formaldehyde condensate as the basic compound in synthesizing the cationic resin condensation product, the alcoholic or phenolic hydroxy groups of which are partially or totally etherified. The use of these raw materials permits the internal plasticizing of the binders and, in turn, substantially increases the flexibility of the cured films which is essential in chip-resistance coatings.

The present invention, therefore, is concerned with a process for producing cathodically depositable self-crosslinking binders for electrodeposition based on alkylphenol-formaldehyde condensates and to the binders obtained. The binders are characterized in that an alkylphenol-formaldehyde condensate having a molecular weight of at least 500 and a hydroxyl value of between 100 and 700 mg KOH/g, modified through self-condensation and/or etherification of the phenolic hydroxy groups, obtained through a reaction catalyzed with a base (component A), is reacted simultaneously or separately with (B) amines, which carry a tertiary amino group and at least one hydroxy group and/or primary or secondary amino group (component B), and (C) aromatic and/or aliphatic and/or cycloaliphatic di- or polyisocyanates (component C), the weight ratios being chosen in order that per mole of component (B) 2 to 4 NCO-equivalents of component (C) are present and the isocyanate-group-free reaction product has an amine value of between 40 and 120 mg KOH/g. According to this invention, binders are obtained which are free from saponifiable ester groups and which therefore exhibit superior stability in an aqueous medium. As a result of the splitting-off of part of the amine during cross-linking, the number of the sites which can be attacked by chemical influences is substantially reduced.

The improved coatings of this invention are particularly surprising in that the known CED binders based on phenol-formaldehyde condensation products, for example those with the structure of MANNICH-bases, could not meet the needs of the automobile industry with regard to the necessary protection against corrosion, required of the primer for a car body. Furthermore, such products, during the curing reaction, release relatively large quantities of hazardous products during the curing reaction.

Suitable materials for use as component (A) are the modified alkylphenol-formaldehyde condensates (resols) obtained through alkaline condensation having an average molecular weight of at least 500 and a hydroxyl value of from 100 to 700 mg KOH/g. The hydroxyl value refers to both alcoholic and phenolic hydroxy groups. Alkylphenols, as used herein, include the ortho-, meta-, and para-substituted products of phenol with straight chain or branched alkyl radicals. Compounds of this class are isomeric cresols, xylenols, butyl-, amyl-, octyl-, or nonyl-phenols, or mixtures thereof. The compounds preferred in the process of the invention are the ortho- and para-substituted phenols. Particularly preferred are those alkylphenols with from 4 to 10 C-atoms in the alkyl radical, such as p-tert.butylphenol, amylphenol, octylphenol, or nonylphenol.

The formaldehyde is reacted with the alkylphenol to provide resol formation in the presence of alkaline substances such as alkali hydroxides, alkaline earth hydroxides, or (cyclo)-aliphatic tertiary amines or quaternary ammonium hydroxides, at temperatures of below about 100° C. Methods and reaction mechanisms for the preparation of these condensates are known to those skilled in the art and need no further explanation. It is essential for the process of the invention that neither salts nor water are present in component (A). The ratio between formaldehyde and alkyl phenol is, in general, not critical. The preferred quantity is 0.2 to 1.2 moles of formaldehyde for each receptive site. In order to obtain the desired molecular weight, the condensates are either subjected to self-condensation or to a partial or total etherification with mono- and/or polyalcohols. These reactions are also known to those skilled in the art.

Suitable alcohols for etherification are monoalcohols with from 1 to 4 C-atoms, particularly ethanol or butanol. These alcohols are used alone in case of an already higher molecular condensate, or together with polyhydric alcohols. Suitable polyhydric alcohols are, preferably, diols such as ethylene glycol and its homologues, neopentyl glycol, or polyalkylene glycols such as polyethylene glycols, polypropylene glycols, polytetramethylene glycols, etc. Optionally, polyhydric alcohols such as glycerol, trimethylol propane, trimethylol ethane can be coemployed. In this case, care should be taken not to adversely influence the flexibility through too complex a molecular structure.

All reactions, that is etherification and condensation reactions in the alkylphenol-formaldehyde condensates, can be carried out at atmospheric pressure or preferably at reduced pressure in order to secure the complete removal of water, which is a by-product of the reaction. A preferred method is to carry out the etherification and condensation reaction in the presence of an azeotropic entraining agent such as xylol.

Component (A) can be modified, in addition, by etherifying all or a part of the phenolic hydroxy groups. Suitable etherifying agents are the monoepoxy compounds, such as 2,3-epoxypropanol-1, ethylene oxide, propylene oxide or glycidyl esters, such as those prepared with branched $C_9$–$C_{11}$ carboxylic acids. Similarly, the phenolic hydroxy group may be etherified by reacting it with dioxolon-2 (ethylene carbonate) or 4-methyldioxolon-2 (propylene carbonate).

Suitable materials for use as components (B) are (cyclo)aliphatic amines carrying a tertiary amino group and at least one hydroxy group and/or a primary or secondary amino group. Examples are N,N-dimethylaminoethanol; N,N-diethylaminoethanol; 2-dimethylamino-2-methyl-1-propanol; N,N-diethylpropane-1,3-diamine; N,N-2,2-tetramethylpropane-1,3-diamine; 3-dimethylamino-2,2-dimethylpropane-1-ol; cyclohexyldiethanolamine; methyldiethanolamine; 2-(2-hydroxyethoxy)-ethylamine-1; and 4-(2-hydroxyethyl)morpholine.

Suitable materials for use as components (C) are aromatic, cycloaliphatic or aliphatic diisocyanates or polyisocyanates. Examples are 1,6-diisocyanatohexane; 1-isocyanato-3-isocyanato-methyl (3,5,5-trimethyl)-cyclohexane (=isophorone diisocyanate); 2,4-diisocyanatotoluol; 2,6-diisocyanatotoluol; 4,4′-diisocyanatodiphenylmethane=MDI; or the corresponding 2,4′ and 2,2′ isomers. Those diisocyanates are preferred wherein the NCO-groups have a different reactivity, such as with toluylene diisocyanate (isomer blend available on the market), cyclohexylene diisocyanate, or isophorone diisocyanate.

The reaction between components (A), (B), and (C) is carried out in order that components (A) and (B) are blended, optionally in the presence of inert solvents, and component (C) is slowly added while stirring. It is also possible to prepare a basic intermediate with free isocyanate groups of components (B) and (C) at room temperature, while cooling and to react it at moderately increased temperature with component (A) to consume all isocyanate groups. In another, but less preferred embodiment, components (A) and (C) are blended and then component (B) is added.

The quantities of the reaction partners are chosen in order that the reaction product, calculated on nonvolatile substance, has an amine value, DIN 53 176, of from 40 to 120 mg KOH/g. For each mole of component (B), 2 to 4 moles of isocyanate groups of component (C) are employed. An eventual excess of isocyanate groups serves for linking the molecules with the isocyanate-reactive groups of component (A). The quantity and constitution of component (A) are chosen in order that a reaction masking all of the isocyanate groups not consumed for linking the amine component is safeguarded.

The presence of an inert solvent, such as xylol or methylisobutylketone, during the reaction is preferred. When the reaction is completed, it is advantageous to vacuum-strip the solvent. Subsequently, alcohol solvents such as ethanol, (iso)-propanol, or glycol ethers such as ethylene glycolmonoethyl ether, or ethylene glycol monobutylether can be added to obtain a solids content of from 50 to 90% and to reduce the viscosity.

Further processing of the binders of the invention is effected in known manner, such as neutralization with formic acid, acetic acid, or lactic acid; addition of catalysts and inhibitors, and pigmentation; and dilution with water to achieve a cationic electrodeposition bath. Conditions for deposition and curing of the paint films are also known to those skilled in the art. The curing temperatures for the products prepared according to the invention range from 150 to 200° C., preferably 160°–180° C.

The following examples illustrate the invention without limiting its scope. Percentages and weights refer to weight units, unless otherwise stated. Viscosities are given as Gardner-Holdt Standard (GH).

EXAMPLE 1

184 g of aqueous formaldehyde solution (36%), 3 g of triethylamine and 150 g of p-tert.butylphenol are slowly heated to 60° C. while stirring. After about 7 hours of reaction time the content of free formaldehyde has fallen to a constant value. After cooling to 40° C., 1.5 g of oxalic acid are added. The stirrer is stopped and the water separated during the reaction is sucked off and the resin is washed with water until the separated washing water has a conductivity of less than 1000 micro Siemens/cm. The obtained alkyl phenol resol is mixed with 59 g of 1,6-hexanediol and 1 g of ortho-phosphoric acid (75%). 30 g of xylol are added as an azeotropic entraining agent, and the batch is heated to 150° C. With the temperature slowly rising to 150° C., about 60 g of water are distilled off. The condensed alkylphenol resol is diluted with xylol to a resin solids content of 50%. The product, as 50% dilution in xylol, has a viscosity of M(GH). 117 g (1 val) of N,N-diethylaminoethanol and 117 g of xylol are added to the resol resin solution. At 60° C., while stirring throughly, a blend of 250 g of hexamethylenediisocyanate (3 val) and 250 g of xylol are added continuously.

The batch is heated to 120° C. and at this temperature is held for about 1 hour, while the content of free NCO-groups falls to zero. With rising vacuum, the xylol is stripped at 120° C. and the resin is diluted to 70% resin solids with ethylene glycol monobutylether. A reddish resin solution with an amine value of 95 mg KOH/g is obtained.

100 g of resin (corresponding to 143 g of 70% resin solution) are neutralized with 4.3 g of formic acid, 85% (0.08 moles). 0.5 g of stannous dibutyl laurate are added. While slowly adding 520 g of water while stirring, a turbid binder solution is obtained with does not tend to sedimentation.

Zinc phosphated steel cathodes are coated at 100 volts from the obtained solution, rinsed, and cured at 175° C. for 20 minutes. Smooth, hard, and flexible coatings are obtained.

EXAMPLE 2

To a blend of 880 g of p-nonyl phenol and 800 g of aqueous formaldehyde solution (36%), 160 g of sodium hydroxide solution (40%) are slowly added within 2 hours. The obtained solution is allowed to stand at room temperature until the content of free formaldehyde has fallen to below 3%. The resol is separated by adding 160 g of sulphuric acid (50%) and washed, until it is free from salts. 240 g of xylol are added to the resol resin which is vacuum-distilled at 45°–50° C. with an azeotropic entraining agent until about 112 g of water have distilled off. The clear resin solution has a solids content of 71% and a viscosity of H (GH). the hydroxyl value is 390 mg KOH/g and the water content is 1.2%.

1222 g of the 71% condensed resol resin solution are blended with 546 g of xylol and 130 g of N,N-diethylpropane-1,3-diamine. At 60° C., within a period of 90 minutes, a solution of 261 g of toluylene diisocyanate (avaliable monomer blend) in 174 g of xylol is continuously added in drops. 30 minutes after the end of the addition, no free isocyanate can be traced. The clear light orange colored resin solution has a viscosity of T(GH).

At 60° C., 400 g of an available glycidyl ester of $C_9$-$C_{11}$ carboxylic acids and 50 g of propylene glycol (molecular weight 1000) are added. The temperature is raised to 140° C. and held, until 55 g of water have distilled off with the aid of an entraining agent. The content of oxirane groups is less than 0.1 meq/g. Then, at 140° C., 1010 g of xylol are vacuum-stripped. The solids content is reduced to 65% by adding 850 g of ethylene glycol monobutylether.

Processing and deposition of the resins is carried out as described in Example 1. The obtained films have excellent performance characteristics regarding surface flexibility and degree of crosslinking. Paints, pigmented appropriately, exhibit excellent corrosion resistance, also on untreated steel. Creep rust of 2 mm at a cross incision is observed only after 600 hours of salt spray attack.

As will be apparent to one skilled in the art, various modifications can be made within the scope of the aforesaid description. Such modifications being within the ability of one skilled in the art form a part of the present invention and are embraced by the appended claims.

It is claimed:

1. Process for producing cathodically depositable self-crosslinking binders for electrodeposition based on alkylphenol-formaldehyde condensates, characterized in that an alkylphenol-formaldehyde condensate having a molecular weight of at least 500 and a hydroxyl value of between 100 and 700 mg KOH/g, modified through self-condensation or etherification of the phenolic hydroxy groups, obtained through a reaction catalyzed with a base (component A), is reacted simultaneously or separately with (B) amines which carry a tertiary amino group and at least one hydroxy group or primary or secondary amino group (component B) and (C) aromatic or aliphatic or cycloaliphatic polyisocyanates (component C), the weight ratio of components being chosen in order that for each mole of component (B) 2 to 4 NCO-equivalents of component (C) are present and that the resultant isocyanate-group-free reaction product has an amine value of between 40 and 120 mg KOH/g.

2. Process according to claim 1, further characterized in that in component (A) ortho- or para-substituted alkyl phenols with from 4 to 10 C-atoms in the alkyl radical are used to form the condensate.

3. Process according to claim 1, further characterized in that the alkylphenol-formaldehyde condensate includes alcoholic hydroxy groups etherified with monoalcohols.

4. Process according to claim 3, further characterized in that the hydroxy groups are etherified with monoalcohols and subordinate amounts of polyols.

5. Process according to claim 1, further characterized in that monoepoxy compounds are used for etherification of the phenolic hydroxy groups of component (A).

6. Process according to claim 5, further characterized in that the monoepoxy compound is a 2,3-epoxypropanol-1, an alkylene oxide, or glycidyl esters of monocarboxylic acids with from 6 to 35 C-atoms.

7. Process according to claim 1, further characterized in that the phenolic hydroxy groups of component (A) are etherified by reaction with dioxolon-2 (ethylene carbonate) or 4-methyldioxolon-2 (propylene carbonate).

8. Process according to claim 1, further characterized in that components (A) and (B) are blended, and component (C) is slowly added at from 60 to 80° C. while stirring.

9. Process according to claim 1, further characterized in that components (A) and (B) are blended in the presence of an isocyanate-inert solvent, and component (C) is slowly added at from 60 to 80° C. while stirring.

10. Process according to claim 1, further characterized in that component (A) is reacted with a reaction product of components (B) and (C), carrying one free isocyanate group.

11. Cathodically depositable self-crosslinking binders for electrodeposition based on alkylphenol-formaldehyde condensates comprising the reaction product of (A) an alkylphenol-formaldehyde condensate having a molecular weight of at least 500 and a hydroxyl value of between 100 and 700 mg KOH/g, modified through self-condensation or etherification of the phenolic hydroxy groups, obtained through a reaction catalyzed with a base (component A); (B) amines which carry a tertiary amino group and at least one hydroxy group or primary or secondary amino group (component B), and (C) aromatic or aliphatic or cycloaliphatic polyisocyanates (component C), the weight ratio of components being chosen in order that for each mole of component (B) 2 to 4 NCO-equivalents of component (C) are present and that the resultant isocyanate-group-free reaction product has an amine value of between 40 and 120 mg KOH/g.

12. The binder according to claim 11 wherein in component (A) ortho- or para-substituted alkyl phenols with from 4 to 10 C-atoms in the alkyl radical are used to form the condensate.

13. The binder according to claim 11 wherein the alkylphenol-formaldehyde condensate includes alcoholic hydroxy groups etherified with monoalcohols.

14. The binder according to claim 13 wherein the hydroxy groups are etherified with monoalcohols and subordinate amounts of polyols.

15. The binder according to claim 11 wherein monoepoxy compounds are used for etherification of the phenolic hydroxy groups of component (A).

16. The binder according to claim 15 wherein the monoepoxy compound is a 2,3-epoxypropanol-1, an alkylene oxide, or glycidyl esters of monocarboxylic acids with from 6 to 35 C-atoms.

17. The binder according to claim 11 wherein the phenolic hydroxy groups of component (A) are etherified by reaction with dioxolon-2 (ethylene carbonate) or 4-methyldioxolon-2 (propylene carbonate).

18. The binder according to claim 11 wherein components (A) and (B) are blended, and component (C) is slowly added at from 60 to 80° C. while stirring.

19. The binder according to claim 11 wherein components (A) and (B) are blended in the presence of an isocyanate-inert solvent, and component (C) is slowly added at from 60 to 80° C. while stirring.

* * * * *